May 11, 1954  K. Y. MESSICK  2,678,005
HIGH-PRESSURE PUMP
Filed Dec. 13, 1949
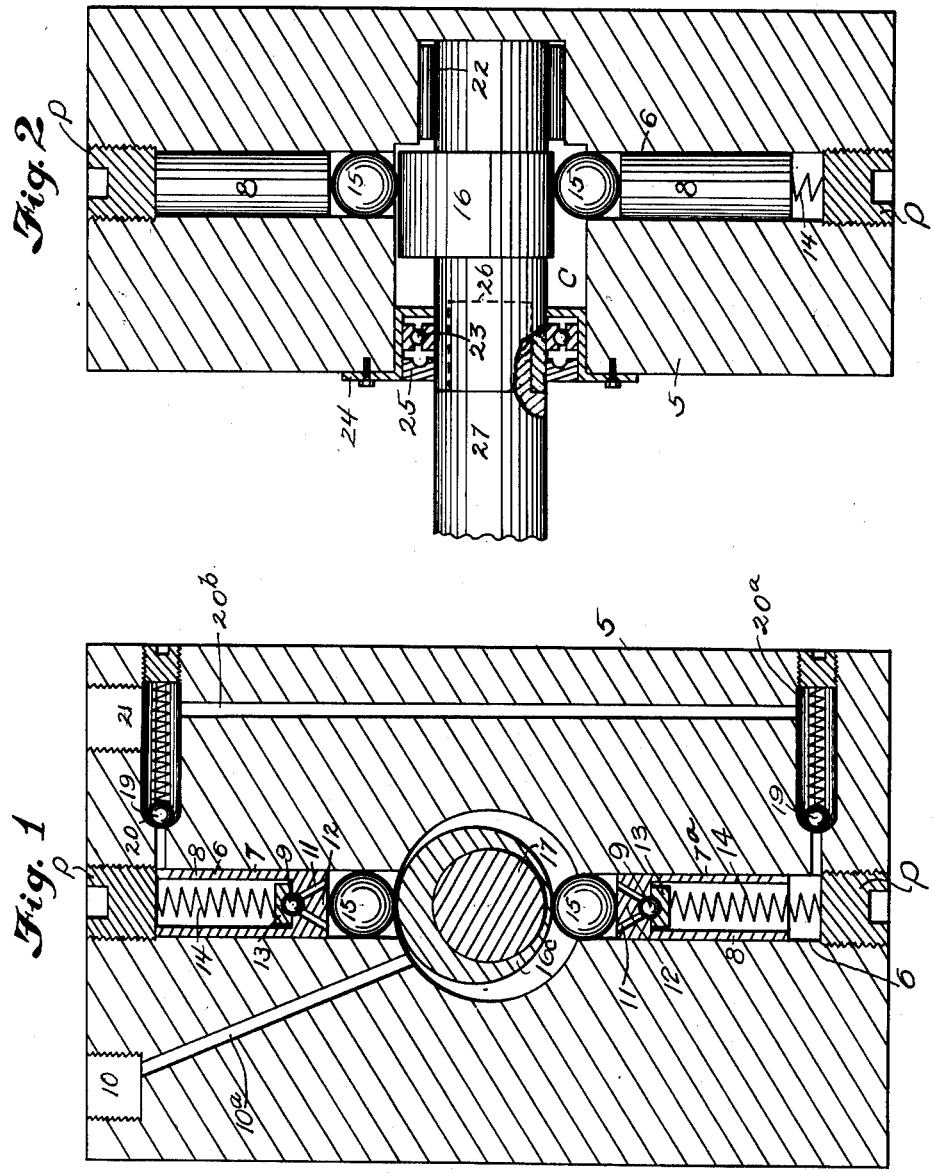
INVENTOR
Kirwan Y. Messick,
BY
ATTORNEYS Patented May 11, 1954

2,678,005

UNITED STATES PATENT OFFICE 2,678,005

HIGH-PRESSURE PUMP

Kirwan Y. Messick, Arlington, Va., assignor of one-fourth to Frank G. Campbell, Arlington County, Va.

Application December 13, 1949, Serial No. 132,717

3 Claims. (Cl. 103—185)

This invention relates to high pressure pumps and it has for its object to provide a small but exceedingly powerful pump capable of delivering pressures of several thousand pounds, but one which can be made and sold at a very low cost.

The invention will be best understood by reference to the accompanying drawing wherein:

Fig. 1 is a sectional view through a block of metal having the pump elements incorporated therein; and Fig. 2 is a fragmentary transverse sectional view through the central part of the block showing the manner of mounting the pump shaft.

In creating the pump of the invention a solid metallic block 5 of steel or other suitable strong metal is bored through as at 6 and by that single operation there is created the pair of cylinders 7, 7a for the reception of the hollow pistons 8. These pistons carry ball check valves 9 which control the flow of oil or other pressure fluid from oil inlet 10, port 10a and a central cavity C, through ports 11, formed in the heads 12 of the pistons. Caps 13 receive the thrust of springs 14 which tend to seat the balls 9 to cover or close the mouths of the ports 11. The disposition of the ports 11 at an angle, as shown, leaves the central part of the piston heads 12 solid and capable of receiving the thrust of bearing balls 15, said balls riding upon the periphery of an eccentric 16 that is carried by the main pump shaft 17 and is disposed in the central cavity C. When one piston is being moved inwardly by its spring 14 the other is being thrust outwardly by the eccentric. When a piston is thrust inwardly by its spring, oil passes its check valve 9 and into the hollow piston and when the pistons move outwardly the oil is forced past ball check valves 19 into the discharge conduits 20, 20a and 20b to the outlet 21.

The main shaft is supported in properly dimensioned portions of block 5 by roller bearings 22 and ball bearing 23. A cap 24 and oil seal ring 25 complete the mounting of the shaft. The shaft comprises a socket 26 which may receive any suitable driving element such as the shaft 27 of an electric motor (not shown).

I am aware of the fact that it is not new to provide opposed pistons operated alternately by an eccentric. However, the present invention goes beyond that bare thought. Modern industry has resorted so overwhelmingly to the use of hydraulic power for the operation of so many widely diversified mechanisms that the demand for a small, cheap but extremely rugged and powerful pump for delivering hydraulic power to such mechanisms has become very great. By starting off with a solid block and boring the same as described I provide two cylinders by a single operation and those in a member capable of resisting very high pressures. Also the closures comprising the cylinder heads may be composed of ordinary threaded plugs P. The other ports may be provided by simple borings of the block and the same is true of the central cavity C in which the eccentric rotates as well as the seats for the roller and ball bearings 22 and 25 upon which the main shaft is mounted are located. The elimination of the cap screws, cap plates and the like ordinarily employed in pump structures saves material and many hours of labor. Also, as far as I am aware, I am the first to provide a pump in which pistons of elongated form and having relatively long bearing surfaces engaging the cylinder walls are actuated by antifriction rolling balls which lie and act between the cylinder heads and the unbroken periphery of an eccentric.

By directly boring through a solid block and then suitably hardening the cylinder walls not only is much expense avoided but the cylinders are disposed in opposition to each other, so that a piston in one may be moved on its working stroke at the same time that a piston in opposition thereto moves on its suction stroke.

The eccentric and ball arrangement provides parts operating with but very little friction and the throw of the eccentric and its diameter may be such that a long travel of the eccentric surface past the ball imparts but a short stroke to the piston. This has a gearing down effect through which, by means of a pump costing but a few dollars, I can safely and reliably generate pressures of several thousand pounds.

The invention is not limited to the precise construction set forth but includes within its purview whatever changes fall within either the terms or the spirit of the appended claims.

Having described my invention what I claim is:

1. A pump comprising a solid metal block bored in a straight line to provide a pair of cylinders at opposite sides thereof, hollow pistons in said cylinders having heads presenting solid central portions, a port formed through each head outwardly of said solid central portion, a main shaft, positioned between said cylinders with its axis perpendicular to the axes of said cylinders, an eccentric on the main shaft and antifriction balls retained in position in said boring which creates the cylinders, said balls bearing directly between the periphery of the eccentric and the solid central portions of the cylinder heads at the axis of the cylinders, the diameter of said balls so closely approximating the diameter of the cylinders that said balls are guided and held against transverse movement in the cylinders, said balls being adapted to move longitudinally of the bore of the cylinders.

2. A hydraulic pump comprising a cylinder, a main shaft having its axis disposed perpendicular to the axis of the cylinder, an eccentric upon the shaft, said eccentric having a circular smooth working face, a hollow piston in the cylinder having a solid central head portion, a ball having rolling engagement with the face of the eccentric and with the solid central portion of the piston head, the diameter of said ball closely approximating the internal diameter of the cylinder and said ball traveling axially in and being guided by the cylinder walls as the eccentric thrusts the ball toward the piston, and spring means tending to thrust the piston and ball toward the eccentric, there being a port formed through said head portion of the piston at a point laterally offset from the solid central portion thereof and a check valve disposed to close said port upon outward movement of the piston.

3. A high pressure pump of the character described comprising a block of metal bored to form at least two opposed cylinders at opposite sides of the block and a central cavity in the block into which said cylinders open, a shaft traversing said cavity and having its axis disposed perpendicular to the axis of said cylinders, an eccentric on said shaft, an inlet for fluid to be pumped leading to the cavity, a pair of hollow pistons mounted to slide in the cylinders and having heads facing toward the cavity, balls located in the inner portions of the cylinders and bearing between the central portions of the piston heads and the eccentric, springs in the hollow pistons tending to thrust them inwardly, ports formed through the piston heads outwardly of the centers thereof, outlet conduits leading from the outer ends of the cylinders to a common point of discharge, outwardly opening check valves controlling said conduits, and check valves in the hollow pistons which seat upon and close the ports of the piston heads upon outward movement of the pistons under the thrust of the eccentric, the inward movement of the pistons causing the fluid to be pumped to flow past the check valves of the pistons into the interior of the pistons, the outward movement of the pistons forcing said fluid out of the outlet conduits, the diameter of the balls so closely approximating the diameters of said cylinders that said balls are guided and held against transverse movement in the cylinders, while being adapted to move longitudinally of the bore of the cylinders.

References Cited in the file of this patent

UNITED STATES PATENTS

| Number | Name | Date |
| --- | --- | --- |
| 1,964,245 | Benedek | June 26, 1934 |

FOREIGN PATENTS

| Number | Country | Date |
| --- | --- | --- |
| 316,328 | Germany | Nov. 25, 1919 |
| 602,199 | Great Britain | May 21, 1948 |
| 603,234 | France | Sept. 13, 1948 |
| 855,690 | France | May 17, 1940 |